United States Patent [19]

Mason et al.

[11] Patent Number: 4,495,416
[45] Date of Patent: Jan. 22, 1985

[54] REMOTE SENSING INSTRUMENT

[75] Inventors: Ross S. Mason, Upper Hutt; Peter J. Ellis, Wainuiomata, both of New Zealand

[73] Assignee: New Zealand Government Property Corporation, New Zealand

[21] Appl. No.: 414,435

[22] Filed: Sep. 2, 1982

[30] Foreign Application Priority Data

Sep. 3, 1981 [NZ] New Zealand .................. 198264

[51] Int. Cl.³ .............................................. G01J 1/00
[52] U.S. Cl. .................................. 250/338; 250/342
[58] Field of Search ............ 250/338, 340, 339, 342; 350/1.4

[56] References Cited

U.S. PATENT DOCUMENTS

| | | | |
|---|---|---|---|
| 3,104,478 | 9/1963 | Strauss et al. | 250/342 |
| 3,402,295 | 9/1968 | Astheimer | 250/342 |
| 3,524,180 | 8/1970 | Cruse | 250/349 |

Primary Examiner—Janice A. Howell
Attorney, Agent, or Firm—Cantor and Lessler

[57] ABSTRACT

A hand-held, battery powered instrument for the determination and recording of the intensity of radiation emitted or reflected by a target in the field in spectral bands from 400 nm to 12 micrometers. Two fields of view, typically 20° and 1°, are provided. The pointing accuracy is 0.1° or better. Multiple detectors are controlled by a single shutter. Gain and zero controls are preset, the whole spectral band is sampled in 4 seconds, and the results stored. They are later called up and shown on a liquid crystal display digitized to 9999.

8 Claims, 2 Drawing Figures

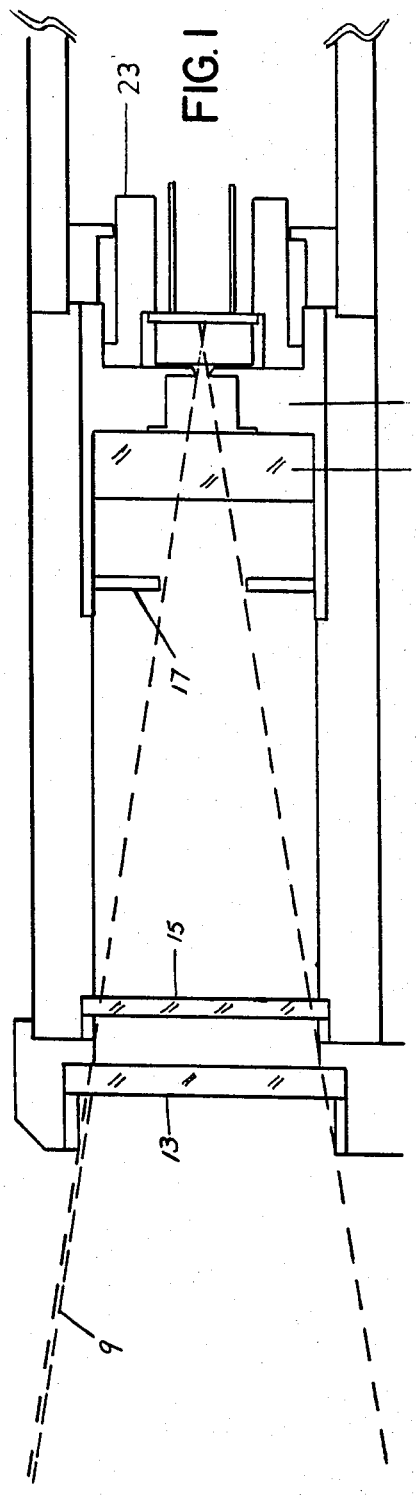
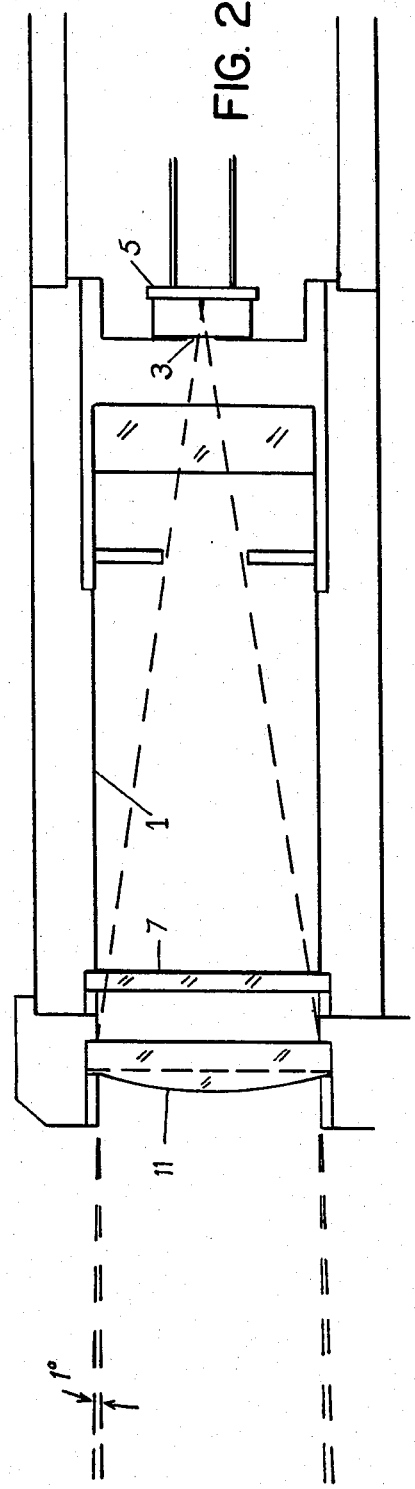

REMOTE SENSING INSTRUMENT

This invention relates to an instrument for the remote determination of radiance and irradiance in the visible and infra-red spectrum.

Measurement of the reflectance of ground targets is an important part of any remote sensing programme. In particular, the variation of reflectance with wavelength constitutes the 'spectral signature', which can often be used to distinguish one target from another.

The Remote Sensing section at the New Zealand Physics and Engineering Laboratory has been making ground measurements of target reflectance since 1973. Until recently, the instruments used were commercially available ground radiometers which operated in the same four regions of the spectrum utilised by the Landsat satellite Multi-Spectral Scanner (MSS). In theory at least, it is possible to compare measurements taken with the ground instruments with the corresponding radiance levels derived from the MSS image. We have used a Landsat-band ground radiometer to measure the spectral reflectance, i.e. the reflectance variation with wavelength, of agricultural crops, forests, pasture, water and other ground features. These measurements have helped to determine the feasibility of separating and classifying these features from Landsat images and from multispectral photographs taken from aircraft.

The radiometer is also used in the aircraft to determine the correct exposures for multispectral photography. Using an irradiance adaptor to measure the intensity of incident radiation, we have also been able to estimate the effect that the atmosphere has on each Landsat image, and a series of correction factors for Landsat image processing has resulted from these measurements.

2. DESIGN PHILOSOPHY

The radiometers previously used by the remote sensing section have certain disadvantages. More recent remote sensing satellites such as Nimbus 7 and Landsat D have sensing instruments which cover more spectral bands than the Landsat MSS, and which admit radiant energy in spectral bands which are narrower than the MSS bands.

From a practical point of view, we have found that the Landsat ground radiometers were less than ideal for some of our measurements. Some radiometers consist of several modules linked by cables, all of which have to be assembled and carried by the operator, and which are bulky to pack and transport. Typically, measurements in each spectral band are conducted in sequence by the operator, by switching optical filters and changing the gain levels. By this method, a sequence of four readings may require several minutes. Our measurements here and in Australia have shown that the incident radiation intensity can change significantly in this time. For use in aircraft, the time lapse between measurements is clearly unacceptable.

For these reasons, we have designed a radiometer which overcomes most of these problems, and is versatile enough to be applied in fields of work which may be far removed from the original earth resources applications.

Accordingly the invention consists of: An instrument for the determination and recording of the intensity of radiation emitted or reflected by a target in one or more spectral bands within the visible and infra-red spectrum, including at least one measuring system wherein in a first arrangement the instrument has a field of view collimated by two apertures, within the range 10 degrees to 30 degrees, with a penumbra lying between 0.2 degrees and 1 degree, surrounding the main field of view.

The invention consists in the foregoing and also envisages constructions of which the following gives examples only with reference to the accompanying drawings in which:

FIG. 1 shows schematically a cross section of a measuring system (optical part) in the first arrangement, and FIG. 2 shows a corresponding view of the second arrangement.

Our general design philosophy can be summarised as follows:

2.1 Size, Weight and Power

Our objective has been to produce a small portable instrument in a single module, which can be carried, aimed and operated with one hand. The result has been a 'pistol' type of design, with a detachable handle for ease of carrying. A trigger on the pistol-grip is used to activate the measuring system. The use of CMOS electronics has ensured on extended lifetime of operation powered by small dry batteries.

2.2 Optics

New satellite instruments will have seven or more spectral bands. We have therefore designed an eight-band radiometer, in which each bandpass is determined by a high quality interference filter. The filters are easily changed to suit a particular customer specification.

Eight separate optical systems are used, with eight detectors and eight pre-amplifiers. This means that all measurements and recordings are virtually simultaneous. Each optical channel consists of a tube 1 with a very small aperture 3 and detector 5 at one end, and a large aperture 7 at the other. These apertures define a wide field of view (20 degrees in the present instrument). The presence of a small penumbra 9 at the edges of the field of view is acceptable, since in this measurement mode the instrument is used to view extended targets at close range.

A clip-on lens plate, containing eight single element plano-convex lenses 11, can be set in front of the large entrance apertures 7, with the focus of each lens occurring in the plane of the small aperture 3. This effectively defines a much narrower field of view, (typically 1 degree), and enables the instrument to measure the radiance of targets of small size. If a suitable plane glass window 13 is substituted for the lens plate, thus maintaining the transmission and reflection losses at a constant level, it can be shown that the signal due to a target of given radiance will be the same for both modes of operation.

A protective window 15 keeps dust and other objects out of the path of the radiation that is being measured. It is present in both arrangements and for all spectral bands, so it does not change the measured values when the field of view is changed.

A baffle 17 reduces stray reflections within the tube.

Another clip-on front plate consists of a translucent screen (not shown) which permits global irradiance measurements to be made. Global irradiance is a measure of the total incident radiation at the surface of the earth, and is required for the calculation of target reflectance.

2.3 Electronics

A problem in the past has been the need to standardise the range, zero and gain of each radiometer band before and during each series of measurements. These adjustments are undesirable in field conditions and are liable to cause errors. Our design approach has been to aim for very high stability in the signal processing channels. This has enabled all gain and zero controls to be pre-set, with no need for adjustment in the field. After pre-amplification, each signal is digitised and stored in a digital memory (not shown), and can be read in retrospect by the operator on a four-digit LCD display (not shown). The wide range of the display (0-9999) removes the need for a range switch. The memory store eliminates the need for the operator to record each reading at the time of aiming and firing the instrument.

2.4 Spectral Range

The first version of the radiometer uses detectors 5 which cover the visible and near infra-red spectrum to a maximum wavelength of 1100 nanometers. This is adequate for many remote sensing applications in the reflective part of the spectrum, that is which utilise reflected sunlight.

For applications in the emissive part of the spectrum, for instance remote sensing of surface temperature, it is necessary to use different detectors and transmitting optics. The second version of the radiometer uses pyroelectric detectors and germanium lenses in four of the channels, to cover the spectrum from 1-12 micrometers. Pyroelectric detectors respond only to transient signals, and are normally employed in conditions where the incoming radiation is 'chopped' at a single frequency by a rotating or vibrating chopper. The use of a chopper and its associated signal processing electronics is expensive and cannot be easily packaged in a small space. We have adopted a novel approach, in which a single shutter is used to uncover the four detectors at the time of measurement, and the resulting transient signals are sampled within one second, digitised and stored in memory. Thus a single instrument has been devised which covers the spectrum from 400 nm to 12 micrometers.

2.5 Remote Sensing Applications

We believe that a wide range of uses exists for the eight-channel radiometer in remote sensing applications. Applications found in New Zealand so far can be summarised:

2.5.1 Measurement of spectral radiance of ground targets, for comparison with airborne and satellite imaging data.

2.5.2 Determination of exposure in aircraft multispectral photography.

2.5.3 Measurement of biomass in crops and pastures, using proven techniques first developed in the USA.

2.5.4 Measurement of irradiance through the atmosphere, and hence monitoring of atmospheric density and pollution levels.

2.6 Other Applications

With modifications, this design concept can be extended to a variety of applications outside the remote sensing field.

2.6.1 Temperature measurement

Radiation from a warm or hot 'black body' follows closely defined laws in which the emission at each wavelength increases as the body gets hotter, with the wavelength of peak emission moving towards the blue end of the spectrum with an increase of temperature.

For any real surface whose emissivity as a function of wavelength is known, it is possible to determine its temperature from two or more radiation measurements in different spectral bands. It is only necessary to know the relative values of these measurements, since the temperature can be deduced by fitting the results to the shape of the emission/wavelength distribution function.

A modification of the radiometer contains a microprocessor with algorithms designed to select radiation measurements from four bands, and to estimate the temperature by fitting these values to the distribution function, and displaying the results directly.

This concept has been verified in the laboratory.

2.6.2 Colorimetry

The multi-channel capability of the instrument in its present form could be utilised for routine measurements of coloured surfaces, for instance painted panels. We envisage further applications in quality control of products in agriculture, manufacturing and mining.

3. DETAILED DESIGN FEATURES

3.1 Mechanical Design

The main structure of the prototype instrument has been machined from aluminium alloy bar and from extruded sections. In future, plastic could be used for some of the casing, but not for the front-end optical block, since most plastics become transparent in the middle infra-red region of the spectrum.

The eight barrels containing the optics must be accurately aligned, with precise location of the two aperture plates, in order to ensure a consistent field of view in all spectral bands. These components are machined to a high tolerance. The barrels are arranged in two rows of four, with the detector/pre-amplifier board mounted directly behind them. All the electronics and the rear panel are mounted on a sub-frame attached to the optical block. A cover in the form of a rectangular tube fits over this assembly, with a window for viewing the LCD display.

The battery pack is also fitted to the sub-frame, and the instrument can be tested with the cover removed, conveniently exposing all the circuit boards. The pistol-grip handle is adapted from a standard cine-camera handle, with the trigger linked to a push-rod. The push-rod activates a micro-switch within the body of the instrument. There are thus no external electrical connections necessary.

The handle is connected to the instrument by a standard screw connector. This enables the instrument to be used with a tripod when required.

3.2 Sighting

Sighting of the instrument is accomplished by means of a specially designed sighting telescope (not shown), mounted on the side of the instrument. The telescope has a magnification of one, and is used to translate the operator's field of view from the rear to front of the instrument. It contains a means which define the 20 degree field, and the 1 degree field. A feature of the telescope design is that it can be produced at low cost. The telescope design is the subject of another patent application.

3.3 Detector Alignment

The detector chips are enclosed in TO-5 cans, and are offset from the mechanical axis. Prior to insertion in the instrument, they are set in alloy rings 23 with epoxy resin, and centred on the axis by microscope.

3.4 Filter and Aperture Assembly

The band-pass filters 19 used in the radiometer are of the multi-layer interference type, and vary considerably in thickness. The filters are placed between the two apertures 3 and 7 in the optical assembly. Thus, when the lens plate is used, the point of focus will be modified by the thickness of the filter. To enable a standard barrel length to be employed, we have devised a plug-in capsule 21 which contains the filter and small aperture, and which positions the aperture at the correct point of focus along the optical axis. To change the filter a complete capsule can readily be inserted.

3.5 Electronics

The PIN photodiode detectors are operated in the zero bias mode for optimum drift stability. The pre-amplifiers are of the integrated chopper-stabilised type with very high drift stability.

The pre-amplifier outputs are multiplexed into the analogue to digital converter, when the radiometer is operating in the auto mode (See section 5.5). A random access memory is used to store the eight values, which can be accessed by the operator by a thumbwheel on the rear of the instrument. Using the triggered mode, the operator switches the instrument on, aims and squeezes the trigger. This activates a four second sequence. The first two seconds are used to apply power to the pre-amplifiers and allow them to stabilise. The eight channels are sampled, digitised, and the results stored in the next two seconds.

Since over 80 percent of the instrument power is used by the pre-amplifiers, activating them only during the measurement sequence extends the life of the batteries by more than five times.

The instrument can also be operated in the continuous mode in which any channel selected by the thumbwheel can be continuously displayed.

4. CALIBRATION AND PERFORMANCE CHECKING

4.1 Gain and Drift Stability

The gain in each channel is independently set up in each pre-amplifier by using an appropriate value of feedback resistor to obtain a coarse setting, and a pre-set potentiometer for a fine control. Zero levels are established with fixed resistors only, on the assumption that the input circuits are stable enough not to require resetting at a later date. The value of zero drift with temperature and gain variation with temperature has been measured on the prototype instrument and is listed in the specification.

4.2 Spectral Responsivity

The spectral responsivity of each instrument channel is established by observing the instrument response to a radiant input from a monochromator. The filter bandwidth in the visible and near infra-red region can conveniently be 20 nanometers.

4.3 Field of View and Alignment

The field of view is checked by plotting the instrument output against rotation angle, while viewing a slit light source at the focus of a collimating lens. For the 1 degree field, this measurement is also used to check that an object at infinity is focussed on the aperture.

Alignment of the channels and the telescope is accomplished by using a slit or point light source at the focus of a collimating lens of sufficient size to cover all the entrance apertures. Scanning the source across the 1 degree field of view should result in consistent responses from all channels, since the collimated source appears to be at infinity.

4.4 Absolute Calibration

A radiometer can only be calibrated in meaningful terms if the spectral responsivity is known. The instrument output is proportional to the area under a curve formed by multiplying the spectral radiance of the source, by the spectral responsivity of the instrument at each wavelength.

The absolute calibration is made using a standard lamp of known spectral radiance, irradiating a target of known reflectivity such as a barium sulphate surface. The radiance seen by the instrument can be calculated by computing the product of the two curves, and integrating the result.

5. BRIEF SPECIFICATION OF RADIOMETER

5.1 Physical Dimensions

Radiometer: 250×142×51 mm
Handle: 117 mm long (detachable)
Weight: 0.8 kg

5.2 Optical Specifications

Field of View:
 20 degrees
 1 degree with clip-on lens plate
 Cosine response with cosine adaptor (See Section 5.5)
Pointing Accuracy:
 0.057 degrees (mean of 7 channels relative to channel '0'). <0.1 degree all channels.
Sighting: Telescope with 20 degrees and 1 degree ring-sight
Filters: Bandwidth and passband selected according to application.

5.3 Electrical Specifications

A/D Converter: 14 bits resolution
Sampling time:
 4 seconds in 'auto' mode
 125 milliseconds in 'cont' mode
Display type: Liquid crystal
Display range: 0–9999
Batteries: 3×9 v No. 216 Batteries
Battery life: 100 hours intermittent use

5.4 Temperature Stability

Temperature range: 0–35 deg Celsius
Zero drift: <0.5 digit/deg C./channel
Gain: <1 digit/deg C./channel at 75% F.S.D.

5.5 Operating Modes

Auto: Trigger operated sample and store (4 second cycle time)

Cont: One channel only (selectable by thumbwheel switch)

Standby: Low current drain—retains results in memory.

Optical: 20 deg, 1 deg radiance modes 180 deg cosine irradiance mode

We claim:

1. An instrument for the determination and recording of the intensity of radiation emitted or reflected by a target in one or more spectral bands within the visible and infra-red spectrum, including at least one measuring system wherein the instrument has a field of view collimated by an object aperture and a detector aperture, within the range 10 degrees to 30 degrees, with a penumbra lying between 0.2 degrees and 1 degree, surrounding the said field of view.

2. An instrument as claimed in claim 1 wherein a planar sheet of glass is held to the object aperture.

3. An instrument as claimed in claim 1 wherein an exchangable interference filter determines the pass band of the measuring system.

4. An instrument as claimed in claim 1, wherein the instrument is adapted to operate simultaneously in more than one spectral band by independent measuring systems for each such band under a single control, and with a single recording from all the bands.

5. An instrument as claimed in claim 1, wherein each measuring system which is adapted to operate in an infra-red band is fitted with a pyroelectric detector, and in all such systems fitted to one instrument, means are provided whereby the radiation whose intensity in one or more infra-red bands is to be determined is presented to the detector by way of a shutter which is opened to admit the radiation to be measured and closes at the end of the sampling time required by the pyroelectric detector.

6. An instrument as claimed in claim 1, including a computer which compares the observations of radiance made at different wavelengths, with a black-body distribution, whereby the temperature of the target may be deduced from measurements that are only relative.

7. An instrument as claimed in claim 1, wherein power is applied to the high-current consuming parts of the instrument only during the measuring cycle.

8. An instrument as claimed in claim 1 wherein a plano-convex lens shaped as to present to the detector aperture a field of view of less than 2 degrees and a focussed image of the object at infinity is held to the object aperture.

* * * * *